United States Patent [19]

Cherukuri et al.

[11] Patent Number: 4,753,805
[45] Date of Patent: Jun. 28, 1988

[54] TABLETTED CHEWING GUM COMPOSITION AND METHOD OF PREPARATION

[75] Inventors: Subraman R. Cherukuri, Towaco; Kirshnayya Bikkina, Edison, both of N.J.

[73] Assignee: Warner-Lambert Company, Morris Plains, N.J.

[21] Appl. No.: 835,131

[22] Filed: Feb. 28, 1986

Related U.S. Application Data

[63] Continuation-in-part of Ser. No. 575,610, Jan. 31, 1984, abandoned.

[51] Int. Cl.$^4$ .............................................. A23G 3/30
[52] U.S. Cl. ...................... 426/5; 426/548; 426/804; 426/454
[58] Field of Search ................. 426/3, 5, 454, 804, 426/548

[56] References Cited

U.S. PATENT DOCUMENTS

| | | | |
|---|---|---|---|
| 2,290,120 | 7/1942 | Thomas | 426/3 |
| 3,262,784 | 7/1966 | Bucher | 426/5 |
| 4,000,321 | 12/1976 | Mochizuki et al. | 426/5 |
| 4,139,589 | 2/1979 | Beringer et al. | 426/5 |
| 4,161,544 | 7/1979 | Kaul | 426/5 |
| 4,370,350 | 1/1983 | Fisher et al. | 426/5 |
| 4,405,647 | 9/1983 | Fisher et al. | 426/5 |
| 4,493,849 | 1/1985 | Carroll et al. | 426/3 |

FOREIGN PATENT DOCUMENTS

| 0017691 | 10/1980 | European Pat. Off. | |
| 2808160 | 8/1979 | Fed. Rep. of Germany | 426/5 |

OTHER PUBLICATIONS

Derwent Abstract No. 68-79913 for Belgium 686,750, published Feb. 15, 1967.
Derwent Abstract No. 81-73892D for DE 3,010,836, published Oct. 1, 1981.
AT 350,728, published Jun. 11, 1979.
LU 74297, published Aug. 11, 1977.

*Primary Examiner*—Jeanette Hunter
*Attorney, Agent, or Firm*—Daniel A. Scola, Jr.; Henry C. Jeanette; Gary M. Nath

[57] ABSTRACT

A tabletted chewing gum composition having a moisture content of about 2 to about 8% by weight comprising a blended mixture of chewing gum granules comprising gum base, a grinding aid, a sweetening agent and a modified maltodextrin compression aid, wherein said grinding aid is selected from the group consisting of alkali metal and alkaline earth metal phosphates, maltodextrins and mixtures thereof.

16 Claims, No Drawings

TABLETTED CHEWING GUM COMPOSITION AND METHOD OF PREPARATION

This application is a continuation-in-part of U.S. Ser. No. 575,610 filed Jan. 31, 1984 now abandoned.

This invention relates to a tableted chewing gum composition having a moisture content of about 2% to about 8% by weight of the total chewing gum tablet, and a method for producing the same. More particularly the tableted chewing gum compositions comprise a blend of chewing gum granules and a compression aid which is formed into tablets having a moisture content of about 2% to about 8% by weight of the tablet chewing gum composition.

Conventional chewing gum compositions are difficult to form into chewing gum tablets because of their moisture content. Traditional chewing gum compositions contain about 2% to about 8% by weight of water. As a consequence, attempts to grind the chewing gum compositions using readily available and standard techniques known in the art, have been unsuccessful. Generally the chewing gum will jam the grinding machine, sticking to blades, screens and other surfaces. Traditional moisture levels cause caking and balling of the gum, thereby preventing the formation of gum granules necessary for tableting. In attempting to tablet chewing gum compositions having a moisture content greater than 2% by weight, various other problems occur, e.g. adherence to the punch press, compaction in the punch press hopper, poor flow in the feeder section and difficulties with compressibility. Attempts to make tableted chewing gums have therefore concentrated on alleviating moisture from the composition prior to grinding and formation of granulation. Heretofore the art has not disclosed a successful means of tableting gums containing such traditional amounts of moisture using conventional gum-making equipment.

Attempts have been made to chill or freeze the chewing gum composition to facilitate grinding and alleviate the problems mentioned above. U.S. Pat. No. 4,000,321 discloses a chewing gum which is extracted and subsequently cooled to temperatures of $-15°$ to $-20°$ C. for the purpose of comminuting it to a granular material. German Pat. No. 2,808,160 utilizes a low temperature in order to provide granulation suitable for tableting. Similarly, U.S. Pat. Nos. 4,161,544, 4,370,350 and European Patent Application No. 17-691 (1980) use a freezing temperature to facilitate comminution of chewing gum compositions to granular materials suitable for compaction into a tablet.

U.S. Pat. No. 3,262,784 discloses a gum tablet which requires as much as 93.7% sweetener. U.S. Pat. No. 4,405,647 discloses the comminution of chewing gum in a fluidized bed in the presence of a sweetener or inert constituent, e.g., a silicate.

The prior art has therefore basically followed two pathways in attempting to successfully make chewing gum tablets. The first pathway was to alleviate the moisture problem by freezing the chewing gum compositions. While this technique is feasible, it requires equipment other than conventional tableting equipment and requires careful control of humidity during the tableting process. The second pathway focused on changing the conventional formulations and methods to produce granulations having less than 2% by weight of moisture.

The art has recognized the difficulty encountered due to moisture in attempting to form gum granulations suitable for tableting and as a result, there have been no successful chewing gum tablets produced having moisture content of about 2% or greater using a conventional formulation.

In the normal course of developing formulations and in the routine production of tablets, processing problems occur. Sometimes the fault lies with the formula, sometimes with the compression equipment, and sometimes with a combination of these reasons. Capping, lamination, picking and sticking, compressibility and flowability are the most common processing problems. These problems are generally encountered with any tableting process, but are further complicated, as mentioned above, when attempting to tablet conventional chewing gum compositions due to the high moisture content (e.g. 2% by weight or more, as mentioned above.

Capping is the term used in the tableting art to describe the partial or complete separation of the top or bottom of a tablet from the main body. This will occur if the tablet does not release completely from the tablet punch face. Lamination is the separation of a tablet into two or more distinct layers. Lamination is generally a result of poor granulation and compaction. The cause of both these problems is generally ascribed to the entrapment of air among the granules, which does not escape during compression but afterward when the pressure is released. Granulations of the prior art which are light or too dry or powdery are prone to this difficulty. A certain percentage of water is sometimes essential to good compaction and the tableting art has taught the use of hygroscopic substances to help maintain the proper moisture content. As will be described further herein, the instant inventive tableted chewing gum compositions make use of a grinding aid which insures a free-flowing granulation and a compression aid which lubricates the compaction into a tablet. Similarly, the problem of lamination is also avoided by the instant compositions due to the free-flowing of the particles both in the tableting machine hopper and in the punch apparatus itself. This facilitates proper compaction of the granulation into tablet form.

Picking describes the removal of material from the surface of the tablet and its adherence to the face of the punch. It is particularly prevalent in small enclosed areas of engravings which are difficult to cut cleanly and polish smoothly. Sticking describes the adhesion of granulation to the die wall. When this occurs, the lower punches fail to move freely, resulting in strain on the punch heads and other machinery parts. This term is also often used to refer to the build-up of material on the punch faces. Conventional moisture amounts are often responsible for these problems.

It is evident that there is a need in the art for a tableted chewing gum composition and method for tableting the same which uses conventional prior art compositions and which does not suffer from the disadvantages due to moisture described in the art.

It has surprisingly been found that a conventional chewing gum composition having a moisture content of about 2% to about 8% by weight can be granulated utilizing a grinding aid and subsequently blending the resultant granulation with a compression aid. More particularly this invention concerns a tableted chewing gum composition having a moisture content of about 2 to about 8% by weight comprising a blended mixture of chewing gum granules comprising gum bases, a grinding aid, a sweetening agent and a compression aid, wherein said grinding aid is selected from the group consisting of alkali metal or alkaline earth metal phosphates, maltodextrins and mixtures thereof.

Additionally, this invention relates to a process of producing a chewing gum tablet having a water content of about 2 to about 8% by weight which comprises:
(i) preparing a chewing gum composition comprising gum base and a sweetener;
(ii) grinding the chewing gum composition by utilizing a grinding aid selected from the group consisting of alkali metal phosphates, alkaline earth metal phosphates, maltodextrines and mixtures thereof to form a granulation;
(iii) blending the granulation with a compression aid;
(iv) compressing the resultant granulation to form a tablet.

It has been discovered that materials which are naturally very fine in particle size, when used as grinding aids, tend to cause capping problems during tabletting. Additionally, starches and carbohydrates such as polyhydric alcohols and the like are useful as grinding aids, but tend to react with medicaments which may be added to the gum granulation. The instant invention has determined that the alkaline earth metal phosphates and alkali metal phosphates prevent caking and balling of "high", i.e., 2 to 8%, moisture-containing chewing gum compositions during grinding. Additionally, it has been discovered that maltodextrin enhances the grinding of "high" moisture-containing chewing gum compositions by absorbing moisture to allow lubrication in the gum as it separates into granules.

The inventive compositions thus achieve a chewing gum tablet using conventional moisture levels in the gum and on conventional equipment. The prior art powdered, dry tablet is thus avoided. The resultant gum tablets thus contain the moisture necessary to facilitate the release of flavor sweetener and other additives such as medicaments.

The inventive chewing gum compositions and methods require the use of the compression aid to alleviate the problems associated with moisture contents of 2% by weight or greater. Additionally, this invention requires the use of a grinding aid to facilitate the formation of the granulation, which is later to be tabletted. The use of the grinding aid and the compression aid are critical to the practice of this invention because they allow for the formation of tabletted chewing gum compositions having a moisture content of greater than 2% by weight; and preferably about 2% to about 8% by weight of the tableted chewing gum. As previously discussed, moisture present in these amounts caused a variety of problems when attempting to use conventional chewing gum formulations and techniques form a chewing gum tablet. The use of the grinding aid to facilitate formation of a chewing gum granulation, which granulation is subsequently blended with the compression aid, allows for chewing gum tablets to be formed having the moisture content mentioned above.

The grinding aid is generally present in the chewing gum composition in amounts of about 0.2% to about 5% by weight of the tableted chewing gum composition, and preferably about 1.5% to about 4% by weight. The most preferred range is about 1% to about 2% by weight. The grinding aid must be finely divided, preferably having a mesh size of about 80 or less, and is preferably water soluble, although water solubility is not critical to its function in the inventive method and compositions.

The grinding aids useful in this invention are selected from the group consisting of alkali metal phosphates, alkaline earth metal phosphates, maltodextrins and mixtures thereof.

Those alkali metal phosphates useful include the calcium phosphate, dicalcium phosphate, tricalcium phosphate, as well as mixtures thereof. Potassium and magnesium phosphate are also useful.

Modified maltodextrin having a bulk density of about 3 to about 17 lbs/cu.ft. in combination with dicalcium phosphate is preferred as the grinding aid.

The chewing gum granulation can have a particle size of about 4 to about 30 mesh. Particles of less than 30 mesh present a high surface area for coverage by the grinding aid. Additionally, there will generally be a wide distribution of particle size when fines are used. This will result in segregation during tableting. Furthermore, the fine particles do not compact well in the tableting process. At a particle size of greater than 4 mesh the particles do not feed well into the tableting press.

In the grinding process, the grinding aid is added continuously and the feed rates of the chewing gum composition and grinding aid are adjusted to obtain the proper weight percent of grinding aid in the chewing gum composition. The chewing gum composition granules of the instant invention can be formed using standard grinding techniques known in the art. The granulation should have good flow properties for precise volumetric feeding of the material to the die cavity. It should also have good compressibility to form the tablet and once the tablet is formed it should be easily ejected from the die.

Traditionally, the problems associated with tablet manufacture include the flow of the granulation, the adhesion of material to the punches and dies, and the release of the completed tablet from its mold. The art has often generally used the term "lubricant" to refer to substances useful in ameliorating these difficulties. The problems of granulation flow, adhesion and tablet release are quite different and require distinct solutions. As such, the terms lubricant, glidant and anti-adherent are used herein to define the specific function and purpose of each material used in solving these problems. The compression aid is present in amounts of about 0.25 to about 15%, preferably about 2% to about 15% by weight of the tabletted chewing gum composition and is comprised of one or more of these materials.

By the term lubricant is meant agents that act between surfaces in relative motion to prevent friction and wear. In the manufacture of tableted chewing gum compositions, lubricants are used to prevent excess wear on dies and punches. True lubricant action is particularly required immediately after compression of the tablet within the die to reduce the friction between the inner die wall and the tablet edge during the ejection cycle. The absence of a lubricant at this stage may cause straining of the press parts and tablets formed thereby may be damaged. Additionally, lubricants help avoid the problem of capping as discussed previously.

The lubricants useful as a component of the compression aid in the inventive compositions and method are among those well known in the art. Representative examples may be selected from the group consisting metallic stearates, hydrogenated vegetable oil, partially hydrogenated vegetable oils, animal fats (e.g. triglycerides), polyethylene glycols, polyoxyethylene monostearate and mixtures thereof. Of particular usefulness are magnesium stearate, calcium stearate and mixtures thereof. Hydrogenated cottonseed oil, solid vegetable oil, hydrogenated soya oil and mixtures thereof are the preferred oil lubricants. In general, the lubricant or mixture of lubricants is present in the composition in amounts of about 0.25 to about 2% by weight based on the tableted chewing gum composition. If oil lubricants are used, it is preferred they be present in amounts of about 0.4% to about 1% by weight of the tableted chewing gum composition.

To solve the problems associated with granulation flow, e.g., the free flow of granulation particles in the tableting machine hopper and in the punch itself, a glidant is used in the inventive compositions. Gidants reduce interparticulate friction and assure smooth and uniform flow of materials from larger apertures to smaller apertures in the tablet presses. Fluidity of the granulating blend is not only important as to the direct effect on uniformity of die fill, and thus uniform tablet weight, but also plays a role in proper homogenity. The contribution a glidant makes toward improving fluidity depends on the chemical nature of the glidant relative to that of the chewing gum granulation, i.e. on the presence of unsaturated valencies or bonds which have potential chemical interaction; and upon physical factors such as size and shape distribution of both the glidant particles and the chewing gum granulation.

For any particular system there is usually an optimum concentration above which the glidant may start to act as an antiglidant. The optimum level depends on several factors, one of which is the moisture level of the chewing gum granulation. In the instant invention, the tableted chewing gum composition is to have a moisture content of about 2% to about 8% by weight. The amount of glidant present in the tableted chewing gum composition is from about 0.5% to about 5% by weight of the tableted chewing gum composition. Those glidants useful are selected from the group consisting of alkali metal salts, talc, starch, polyhydric alcohols and mixtures thereof. Preferably the glidant is selected from the group consisting of calcium carbonate, mannitol, sorbitol and mixtures thereof present in amounts of about 1% to about 2.5% by weight of the tableted chewing gum composition.

Anti-adherents function to prevent tablet granulations from sticking to the faces of the punches and the die walls, but most importantly, prevent adherence of chewing gum granules from adhering to one another, a phenomenon known as blocking. Anti-adherents may be added to the chewing gum composition while the composition is in the hopper, or subsequent to grinding. The anti-adherent is selected from the group consisting of silicates, silicon dioxide, talc and mixtures thereof present in amounts of about 0.2% to about 1% by weight of the tableted chewing gum composition and preferably about 0.3 to about 0.6% by weight. Generally the anti-adherent is a finely divided, low bulk density powder which is preferably water insoluble. The preferred anti-adherents are fumed silica and talc. The term fumed silica is meant to include pyrogenic silicas, micron sized silicas and hydrated silicas.

It is apparent from the above discussion of the three individual components of the compression aid, that certain materials may be useful in more than one component. However, frequently one material may function well in one mechanism, e.g., hydrogenated vegetable oil as a lubricant, but will be ineffective or detrimental toward another mechanism, e.g., hydrogenated vegetable oil may tend to actually retard the flow characteristics of certain solids, making it a poor glidant. Thus, when selecting the specific combination of compression aid components, attention should be given to maximize the advantages of each component and to prevent unnecessary cancellation of one component's effectiveness.

In the practice of this invention any conventional chewing gum composition of the prior art may be used providing it has a moisture content of about 2% to about 8% by weight of the chewing gum composition. Such chewing gum compositions generally comprise a gum base, sweetener, and a softener.

As is well known in the art, the gum base comprises natural or synthetic rubbers or elastomers. The elastomers, of course, are not vulcanized. Illustrative, non-limiting examples of gums or elastomers useful as gum bases are natural rubber, chicle, lechi caspi, jelutong, polyisobutylene, isobutylene-isoprene copolymers, styrene-butadiene copolymers and mixtures thereof. The gum base can comprise 14% to about 50% by weight and preferably about 20% to about 35% by weight based on the total chewing gum composition.

The gum base may contain elastomer solvents to aid in softening the gum or elastomer component. Illustrative, non-limiting examples of such elastomer solvents are the methyl, glycerol or pentaerythritol esters of rosins or modified rosins, such as hydrogenated, dimerized or polymerized rosins or mixtures thereof. Examples of the rosins useful in the preparation of gum bases include the pentaerythritol ester of partially hydrogenated wood rosin, pentaerythritol ester of wood rosin, glycerol ester of partially dimerized rosin, glycerol ester of polymerized wood rosin, glycerol ester of tall oil rosin, glycerol ester of wood rosin and partially hydrogenated wood rosin, as well as partially hydrogenated methyl ester of rosin such as polymers of α-pinene or β-pinene. Terpene resins, including polyterpene and mixtures thereof are also useful. The elastomer solvent can be employed in an amount ranging from about 10% to about 75% by weight of the gum base, preferably about 45% to about 70% by weight.

Corn syrup can serve as a source of moisture and it can be utilized at about 8% to about 30% by weight, preferably about 15% to about 20% by weight. The specific amount of corn syrup will depend on the overall formulation of the gum composition and is controlled to provide a moisture content of about 2% to about 8% as is customary in the art. As used in the specification and claims the item "corn syrup" means corn syrup and fructose syrups, as well as simple syrup.

The chewing gum compositions of this invention will generally include a sweetening agent. The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, sugar, maltose, partially hydrolyzed starch, or corn syrup solids and sugar alcohols such as sorbitol, xylitol, mannitol and mixtures thereof.

B. Water-soluble artificial sweeteners such as the soluble saccharin salts, i.e., sodium or calcium saccharin salts, cyclamate salts, acesulfam-K and the like, and the free acid form of saccharin.

C. Dipeptide based sweeteners such as L-aspartyl-L-phenylalanine methyl ester and materials described in U.S. Pat. No. 3,492,131 and the like.

In general, the amount of sweetener will vary with the desired amount of sweeteners selected for a particular chewing gum. This amount will normally be 0.001% to about 90% by weight when using an easily extractable sweetener. The water-soluble sweeteners described in category A above, are preferably used in amounts of about 25% to about 75% by weight, and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils. While water may be added, independently, with dry sweeteners, it will generally be added as part of a corn syrup.

In order that the chewing gum composition have an acceptable texture it is preferred that a softening agent be included in the composition. Softening agents as used herein refers to emulsifiers, plasticizers, softeners and the like. Illustrative, nonlimiting examples of suitable emulsifiers include lecithin, fatty acid and monoglycerides, di- and triglycerides, propylene glycol monostearate, glycerol monostearate and mixtures thereof. Such materials may be used in amounts of about 1% to about 25% by weight.

A variety of different ingredients such as plasticizers or softeners including hydrogenated vegetable oil, lanolin, lecithin, stearic acid, sodium stearate, potassium stearate, glyceryl triacetate, glycerine and the like as well as natural waxes, petroleum waxes, such as polyethylene waxes, paraffin waxes and microcrystalline waxes may also be incorporated into the gum base to obtain a variety of desirable textures and consistency properties. These materials are generally employed in amounts of up to 30% by weight and preferably in amounts of about 1% to about 25% by weight, and more preferably about 3% to about 70% by weight of the chewing gum composition.

The chewing gum compositions of this invention can additionally include the conventional adjunctives such as coloring agents, flavoring agents, fillers, plasticizers, bulking agents, emulsifiers, softeners and mixtures thereof. The coloring agents include titanium dioxide and the well known food dyes of the art. The fillers include but are not limited to aluminum hydroxide, alumina, aluminum silicates, calcium carbonate, and mixtures thereof. The use of fillers is optional and they may be used in varying amounts. Preferably, the amount of fillers when used will vary from about 4% to about 30% by weight of the final chewing gum composition.

Flavoring agents well known to the chewing gum art can be added to the chewing gum compositions of this invention. Both synthetic flavoring agents and natural flavoring agents derived from plants, leaves, flowers, fruits, etc. and combinations thereof are useful. These flavoring agents are generally liquids. However, they can also be used as spray dried solids. The use of flavoring agents having other distinct physical forms such as powdered flavorings, beaded flavorings and encapsulated flavorings are within the scope of this invention. Illustrative non-limiting examples of flavoring agents include spearmint oil, cinnamon oil, oil of wintergreen (methysalicylate) and peppermint oils. Synthetic and natural fruit flavors useful as flavoring agents include such flavorings as citrus oil, e.g., lemon, orange, lime and grapefruit; fruit essences including apple, strawberry, cherry, banana, pineapple; and the various flavorings such as aldehydes and esters including cinnamyl acetate, cinnamaldehyde, citral diethyl acetal, dihydrocavryl acetate, eugenyl formate, p-methylamisol, and so forth. Generally any flavoring or food additives such as those described in *Chemicals Used In Food Processing*, pub 1274 by the National Academy of Sciences, pages 49-53 and 63-258 may be used.

The term "flavoring agent" as used in the specification and claims means any of the natural and synthetic flavorings used in the chewing gum art and in particular those flavoring agents heretofore described.

The amount of flavoring agent employed is normally a matter of preference and will be determined by such factors as flavor type and the strength desired. In general, amounts of about 0.05% to about 3.0% by weight of the overall chewing gum composition are used, preferably about 0.3% to about 1.5%, more preferably about 0.7% to about 1.2% by weight.

While the chewing gum composition will include flavoring agents, it is within the scope of this invention to add additional flavoring agents to the chewing gum composition granules immediately prior to tableting. Preferably, the additional flavoring agent is in a dry form, e.g., spray dried flavoring or encapsulated flavoring. However, liquid flavoring can be added if it is first blended with the dry components of the lubricating system.

As used in the specification and claims the term "chewing gum composition" means the afore-described prior art gum compositions comprising a gum base, sweetener and softening agent as well as other adjunctives known to the chewing gum art. These chewing gum compositions generally have a moisture content of at least 2% to about 8% by weight of the compositions, preferably about 2% to about 6% by weight, more preferably about 2% to about 4% by weight.

Typical chewing gum compositions for use in the practice of this invention are set forth in Table I.

TABLE I

| Component | Percent by Weight |
|---|---|
| Gum base | 14 to 50 |
| Sweeteners | 0.001 to 90 |
| Softening Agent | 1.0 to 25 |

In preparing the tableting formulation the composition of the compression aid and flavorings is determined and the balance is made up of the chewing gum granulation.

The chewing gum compositions made from the instant process may be of the sugar or sugarless variety and may be formulated into regular or non-adhering chewing gum pieces. Bubble gum, stick gum, center-filled and other gum piece forms well known to the art are contemplated.

While the invention has been described in terms of tableting a conventional chewing gum composition, it is preferred that the chewing gum composition of this invention include medicaments, the resultant tablet being a medicated chewing gum tablet.

The medicament is added to the gum granules along with the compression aid. Pharmaceutical drugs or other active agents are added in a number of forms including encapsulation, but they are preferably added in a dry state. Active agents may themselves be granulated and added in this form to the tableted chewing gum composition.

Liquid, water soluble drugs can be added to a solution of modified maltodextrin and spray dried. Liquid, oil soluble drugs and active agents can be blended with the compression aid components prior to mixing with the gum granules. In that event the liquid drug or active agent should not exceed more than 30% by weight of the compression aid, preferably not more than 20% by weight.

The advantage of the tableted gum composition of this invention as a means for dispensing drugs medicaments and other active agents is that the component is trapped between granules and not within the gum composition. Hence, it is readily bioavailable and nearly completely released upon chewing of the gum. The prior art has heretofore focused on adding medicaments to the gum composition during blending of the chewing gum ingredients into the melted gum base. This results in slow or incomplete release of the medicament since it remains trapped to a large extent in the gum base. The instant gum granulation and moisture content allows for better release of the medicament during mastication. The term "active agent" as used in the specification and claims means any drug, medicament, or other substance taken for its medicinal or dietary properties.

Illustrative, non-limiting examples of active agents which can be incorporated in the gum tablets of this invention include benzocaine, phenolphthaline, laxatives, lobeline sulfate (no smoking aid), calcium carbonate or magnesium carbonate as antacids, aspirin, fluorides for tooth decay prevention, nicotine as a smoking substitute, vitamins, minerals, caffeine, citrated caffeine, caffeine sodium benzoate, caffeine hydrochloride, appetite suppressants, etc. Other active agents which are beneficial to promoting health are contemplated.

Where the active agent is a dry powder it may be added in as much as equal parts by weight as the compression aid. Preferably, however, the active agent comprises about 1 to 5% by weight of the tablet, more preferably about 2% to about 4%, e.g., 3%. For example, where Vitamin C is the active agent it may be added at about 60 mg per tablet. For diet tablets the chewing gum tablet may contain about 5 mg. of benzocain and 75 mg of methylcellulose. Breath deodorizing tablets, for example, may contain about 1 mg. of chlorophyll per tablet.

In general, the process of preparing chewing gum compositions comprises adding to a suitable gum kettle a melted blend of gum base and corn syrup and mixing until homogenous. Usually a homogeneous mass is obtained in about six (6) minutes at a temperature of about 55° to about 65° C. Sugar, dextrose, malto dextrin and color are usually then blended into the homogeneous mass for approximately two (2) minutes. Flavor is added next and mixed until sufficiently homogeneous.

In the process of the inventive compositions, a chewing gum composition containing a grinding aid is made using those general methods of preparation commonly known to the art to produce chewing gum compositions with a moisture content of about 2% to about 8% by weight. The chewing gum composition is then formed into sheets or ropes as is commonly practiced in the art and may be aged for about twenty four hours. The composition is then ground into a granulation to form gum granules at room temperature. Grinding is accomplished using any suitable grinder, for example, a Fritzmill.

The following examples serve to provide further appreciation of the invention but are not meant in any way to restrict the effective scope of the invention. All percentages throughout the specification are by weight of the tableted chewing gum composition unless otherwise indicated.

EXAMPLE I

A chewing gum composition having the following formulation was prepared.

| Component | Percent by Weight |
|---|---|
| Gum base | 21 |
| Corn syrup | 17 |
| Lecithin | 0.2 |
| Glycerin | 0.45 |
| Coloring | 0.1 |
| Flavoring | 0.85 |
| Low density maltodextrin | 1.0 |
| Sugar | 59.4 |
| | 100.00% |

The gum base, corn syrup and lecithin were blended together in a kettle at about 82°–94° C. for two minutes to obtain a homogeneous mixture. The remaining components were added to this mixture and blended for about five minutes. The gum composition was discharged into kettles and formed into ropes which were conditioned for 24 hours. The moisture content of the chewing gum was 3% by weight. The chewing gum composition was then ground into granules in a Fitzmill using 2% by weight based on the chewing gum composition of dicalcium phosphate as the grinding aid.

The granules formed had a particle size of about 4 to 20 mesh. There was no sticking or compacting during grinding, and no gum composition adhered to the equipment.

EXAMPLE II

Example I was repeated substituting 2% of modified maltodextrin having a bulk density of about 4 lbs/cu.ft. as the grinding aid. The results were substantially the same as those achieved in Example I except that the granules appeared to be more free flowing.

EXAMPLE III

The gum granules prepared in Example II were tableted using the formulations set forth in Table II.

TABLE II

| | Tabletting Formulation | | | | | | | |
|---|---|---|---|---|---|---|---|---|
| | Run No. | | | | | | | |
| Component | 1 | 2 | 3 | 4 | 5 | 6 | 7 | 8 |
| Gum granules | 98.5 | 97.5 | 95.5 | 95.5 | 95 | 93.0 | 94.0 | 95.0 |
| Mg stearate | 1.0 | 1.5 | 1.5 | 1.5 | 1.5 | 1.5 | 1.5 | 1.0 |
| Fumed silica | 0.5 | 0.5 | 0.5 | 0.5 | 0.5 | 1.0 | 1.0 | 0.5 |
| Fat(1) | — | 0.5 | 0.5 | 0.5 | 0.5 | — | — | — |
| Modified maltodextrin | — | — | 2.0 | 2.0 | 2.0 | 1.5 | 1.5 | 1.5 |
| powdered flavoring | — | — | — | — | 0.5 | 2.0 | 2.0 | 2.0 |
| Fat(2) | — | — | — | — | — | 0.5 | — | — |
| Total | 100 | 100 | 100 | 100 | 100 | 100 | 100· | 100 |

(1) powdered hydrogenated cottonseed oil.
(2) powdered hydrogenated vegetable oil.

The granules were blended with the remaining constitutes at room temperature for about 15 minutes in a Patterson Kelly Blender and tableted in a Stokes tableting machine.

The results of these runs were as follows:

| Run No. | Remarks |
| --- | --- |
| 1. | Flow problems in tableting machine; sticking in punch die. |
| 2. | Good flow; sticking in punch; fatty taste. |
| 3. | Good flow; good die punch release; no fatty taste; low flavor. |
| 4. | Same as Run No. 3. |
| 5. | Good flow; good release; high flavor |
| 6. | Same as Run No. 5, but with improved flavor. |
| 7. | Good flow; good release; good flavor. |
| 8. | Good flow; good release; good flavor. |

The results of Run Nos. 7 and 8 demonstrate that where modified maltodextrin is used, the powdered triglycerides (hydrogenated oils) are not required as compression aids.

EXAMPLE IV

A chewing gum composition was formulated having the following composition:

| Component | Weight Percent |
| --- | --- |
| Gum base | 22 |
| Corn syrup | 18 |
| Lecithin | 0.4 |
| Glycerin | 0.05 |
| Flavor | 1.4 |
| Sugar | 57.55 |

The gum base, corn syrup and softeners were blended as in Example I at about 82° to 94° C. for two minutes. The remaining ingredients were added to this mixture and blended for about five minutes. Following the procedure of Example II the gum was formed into granules using modified maltodextrin as the grinding aid. The moisture content of the chewing gum composition was 3.33% by weight.

The following formulation was used to prepare chewing gum tablets using the procedure of Example III.

| Component | Weight Percent |
| --- | --- |
| Gum granules | 95.5 |
| Mg stearate | 1.5 |
| Fumed silica | 0.5 |
| Modified maltodextrin | 2.0 |
| Hydrogenated cottonseed oil | 0.5 |

The material was free flowing in the tableting machine hopper and feeder and did not stick in the mold.

EXAMPLE V

A sugar free formulation was used to prepare a chewing gum base as follows.

| Component | Weight Percent |
| --- | --- |
| Gum base | 24.0 |
| Glycerin | 0.5 |
| Lecithin | 0.5 |
| Dicalcium phosphate | 8.0 |
| Sorbo liquid | 14.0 |
| Sorbitol | 52.0 |
| Sodium saccharin | 500 ppm |
| Flavor | 1.4 |
| Color | 0.1 |

The gum base and softener were blended for 2 minutes at 82° to 94° C. and the mannitol and sorbo liquid (sorbitol solution) were added with continued blending for two minutes. Then sorbitol, flavor and sodium saccharin were added with mixing for an additional six minutes. The moisture content of the chewing gum was 2% by weight. The gum composition was granulated as in Example II, using dicalcium phosphate instead of maltodextrin as the grinding aid, and tableted using the following tableting composition:

| Component | Weight Percent |
| --- | --- |
| Gum granules | 95.0 |
| Flavoring (powdered) | 2.0 |
| Fumed silica | 1.0 |
| Powdered hydrogenated vegetable oil. | 0.5 |
| Mg stearate | 1.5 |
| | 100.0 |

EXAMPLE VI

Example V was repeated using the following tableting composition:

| Component | Weight Percent |
| --- | --- |
| Gum granules | 93.0 |
| Flavoring (powdered) | 2.0 |
| Fumed silica | 1.0 |
| Powdered hydrogenated cotton seed oil | 0.5 |
| Mg stearate | 1.5 |
| Mannitol | 2.0 |
| | 100.0 |

The lubricating system comprising the silica, hydrogenated oil, magnesium stearate and mannitol were blended together with the flavoring and blended with the gum granules prior to tableting. The gum granules flowed freely in the hopper and feeder of the tableting machine and released well from the punch die.

The use of active agents in the gum tablets of this invention can be illustrated by the following example.

EXAMPLE VII

A chewing gum composition was prepared using the following formulation:

| Component | Weight percent |
| --- | --- |
| Gum base | 22.0 |
| Corn Syrup | 18.0 |
| Sugar | 57.4 |
| Flavoring | 1.0 |
| Softeners | 0.95 |
| Color (yellow #6) | 0.15 |
| Malic Acid | 0.5 |
| | 100.00 |

The chewing gum composition was prepared and granulated in accordance with the procedure of Example III. The chewing gum had a moisture content of about 3.3% by weight. Gum granules were made from the chewing gum and then tablets were made therefrom using the following tableting composition:

| Component | Weight percent |
|---|---|
| Gum Granules | 92.14 |
| Coated Ascorbic Acid | 1.35 |
| Sodium ascorbate | 1.31 |
| Flavoring | 2.0 |
| Modified Maltodextrin | 1.5 |
| Mg stearate | 1.0 |
| Fumed silica | 0.5 |
| Color (yellow #6) | 0.2 |

The composition was tableted using the stokes tableting machine. There was good flow in the hopper and feeder and good release from the punch die.

EXAMPLE VIII

Three batches of the chewing gum composition of Example I were prepared using 6%, 8% and 10% of the grinding aid, respectively. Dicalcium phosphate was the chosen grinding aid. The gum granules were tabletted using formulation 7 of Table II, Example III. The resultant tablet, as tested by a panel of nine (9) experts was unacceptably gritty and chalky destroying the organoleptic appeal of the chewing gum. Thus, amounts of grinding aid outside the range claimed are not considered useful due to this result.

The invention being thus described, it will be obvious that the same may be varied in many ways. Such variations are not to be regarded as a departure from the spirit and scope of the invention and all such modifications are intended to be included within the scope of the claims.

We claim:

1. A process of producing a tabletted chewing gum composition having a water content of about 2 to about 8% by weight which comprises:
    preparing a chewing gum composition having a water content of about 2 to about 8% by weight comprising gum base and a sweetener selected from the group consisting of monosaccharides, disaccharides, polysaccharides and mixtures thereof;
    grinding the chewing gum composition by utilizing a finely divided grinding aid present in the amounts of about 0.2% to about 5% by weight of the tabletted chewing gum composition and selected from the group consisting of alkali metal phosphates, alkaline earth metal phosphates, maltodextrins and mixtures thereof, to form a granulation;
    blending the granulation with a compression aid comprising modified maltodextrin and one or more materials selected from the group consisting of lubricants, glidants and anti-adherents; and
    compressing the resultant granulation to form a tablet.

2. The process of claim 1 wherein said sweetening agent is selected from the group consisting of sugar, corn syrup solids, and mixtures thereof.

3. The process of claim 1 wherein said materials are selected from the group consisting of metallic stearates, hydrogenated vegetable oils, partially hydrogenated vegetable oils, polyethylene glycols, polyoxyethylene monostearates, animal fats, silicates, silicon dioxide, talc and mixtures thereof.

4. The process of claim 1 wherein said materials are selected from the group consisting of magnesium stearate, calcium stearate, fumed silica, powdered hydrogenated cottonseed oil, powdered hydrogenated vegetable oil, hydrogenated soya oil and mixtures thereof.

5. The tabletted chewing gum composition produced by the process of claim 1.

6. The tabletted chewing gum composition produced by the process of claim 2.

7. The tabletted chewing gum composition produced by the process of claim 3.

8. The tabletted chewing gum composition produced by the process of claim 4.

9. A process for producing a tabletted chewing gum composition having a water content of about 2 to about 8% by weight which comprises:
    preparing a chewing gum composition having a water content of about 2 to about 8% by weight comprising gum base and a sweetener selected from the group consisting of sugar alcohols, water-soluble artificial sweeteners, dipeptide based sweeteners and mixtures thereof;
    grinding the chewing gum composition by utilizing a finely divided grinding aid present in the amounts of about 0.2% to about 5% by weight of the tabletted chewing gum composition and selected from the group consisting of alkali metal phosphates, alkaline earth metal phosphates, maltodextrins and mixtures thereof, to form a granulation;
    blending the granulation with a compression aid comprising one or more materials selected from the group consisting of lubricants, glidants and anti-adherents; and
    compressing the resultant granulation to form a tablet.

10. The process of claim 4 wherein said sweetener is a sugar alcohol selected from the group consisting of sorbitol, xylitol, mannitol, and mixtures thereof.

11. The process of claim 9 wherein said materials are selected from the group consisting of metallic stearates, hydrogenated vegetable oils, partially hydrogenated vegetable oils, polyethylene glycols, polyoxyethylene monostearates, animal fats, silicates, silicon dioxide, talc, modified maltodextrin, and mixtures thereof.

12. The process of claim 9 wherein said materials are selected from the group consisting of magnesium stearate, calcium stearate, fumed silica, powdered hydrogenated cottonseed oil, powdered hydrogenated vegetable oil, hydrogenated soya oil, calcium carbonate, mannitol, sorbitol and mixtures thereof.

13. The tabletted chewing gum composition produced by the process of claim 9.

14. The tabletted chewing gum composition produced by the process of claim 10.

15. The tabletted chewing gum composition produced by the process of claim 11.

16. The tabletted chewing gum composition produced by the process of claim 12.

* * * * *